United States Patent [19]

Quittner

[11] Patent Number: 4,869,775

[45] Date of Patent: Sep. 26, 1989

[54] TAB DEPOSITING DISPENSER

[76] Inventor: John P. Quittner, 2-11 Deepwater Road, Castle Cove, New South Wales, Australia, 2068

[21] Appl. No.: 186,444

[22] Filed: Apr. 26, 1988

[51] Int. Cl.[4] .................................................. B32B 1/00

[52] U.S. Cl. .................................... 156/542; 156/249; 156/DIG. 25; 156/DIG. 33

[58] Field of Search ............... 156/230, 247, 249, 344, 156/350, 351, 364, 361, 289, 540, 541, 542, 577, DIG. 24, DIG. 25, DIG. 33, DIG. 42, DIG. 27, 568

[56] References Cited

U.S. PATENT DOCUMENTS

| | | | |
|---|---|---|---|
| 2,133,341 | 10/1938 | Bronander | 156/361 |
| 2,177,615 | 10/1939 | Autem | 156/361 |
| 3,405,021 | 10/1968 | Marano | 156/361 |
| 3,436,294 | 4/1969 | Marano | 156/361 |
| 3,938,698 | 2/1989 | McDavid, Jr. et al. | 156/568 |
| 4,183,779 | 1/1980 | Barber et al. | 156/542 |
| 4,270,968 | 6/1981 | Dudzik et al. | 156/542 |
| 4,294,644 | 10/1981 | Anderson | 156/361 |
| 4,427,484 | 1/1984 | Cameron, Jr. et al. | 156/542 |
| 4,657,622 | 4/1987 | Paules | 156/DIG. 27 |
| 4,687,535 | 8/1989 | Voltmer | 156/DIG. 33 |

*Primary Examiner*—Michael W. Ball
*Assistant Examiner*—Louis Falasco
*Attorney, Agent, or Firm*—Phillips, Moore, Lempio & Finley

[57] ABSTRACT

A dispenser for applying pressure sensitive tabs to an underlying article, such as a sheet of glass or mirror, includes a first tape reel for dispensing a roll of carrier tape therefrom and a second tape reel for winding up the spent carrier tape after the tabs have been removed. A plurality of guide rolls are mounted in the dispenser for maintaining a predetermined tension on the tape and a depositing mechanism, including a bracket for guiding the tape and a nip roll or plunger, is provided for removing the tabs from the tape and for applying the tabs to the article automatically and in a spaced, controlled manner. The dispenser is preferably held in a fixed position and the article moved thereunder to apply the tabs to the article automatically without the need of a workman.

19 Claims, 4 Drawing Sheets

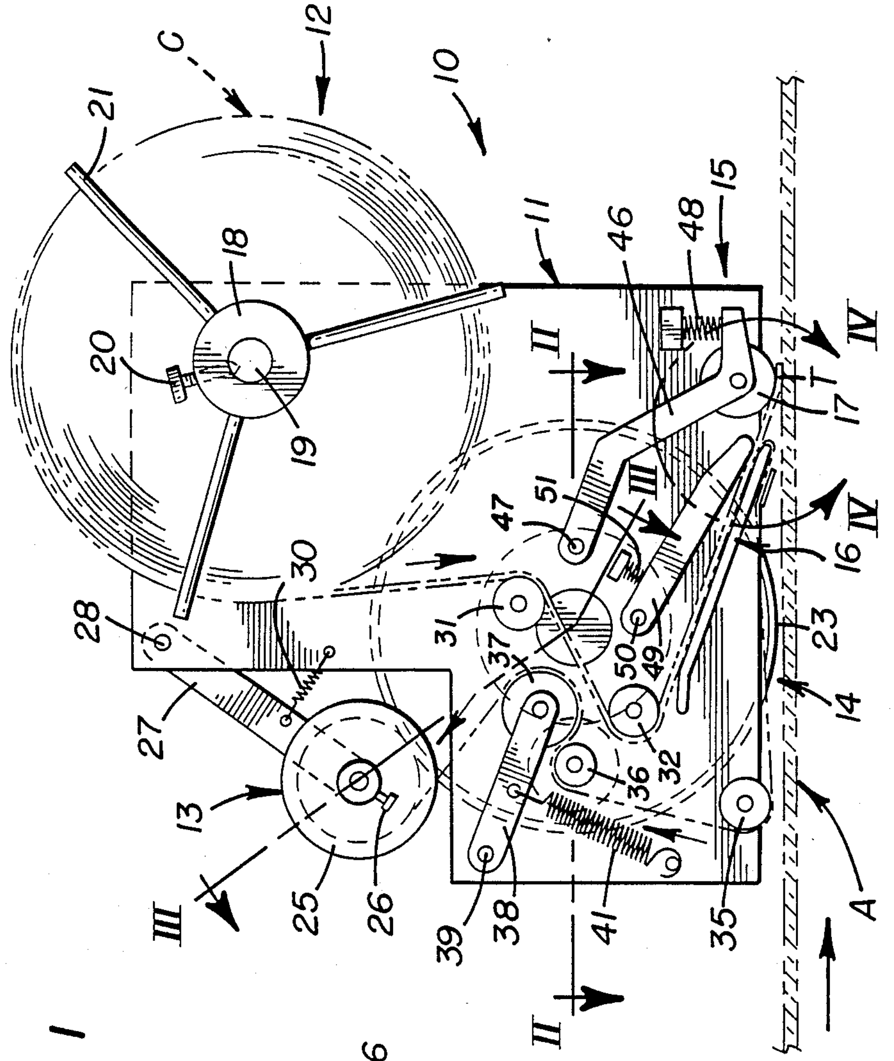
FIGURE I
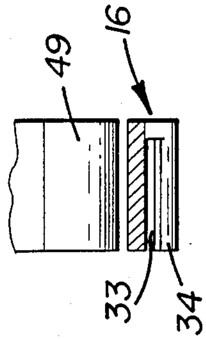
FIGURE 4A

TAB DEPOSITING DISPENSER

TECHNICAL FIELD

This invention relates to a dispenser for applying pressure-sensitive tabs to an article, and more particularly to a dispenser wherein a carrier tape, having a plurality of pressure-sensitive tabs removably attached thereon, is moved through the dispenser for removing and applying the tabs to a sheet of glass, a mirror, or other article surface to be protected.

BACKGROUND OF THE INVENTION

It is common practice to secure felt pads to the exposed surface of a sheet of glass, a mirror, and other surfaces of articles requiring protection during storage or shipment. In conventional practice, the tabs are removed from a carrier tape and applied to the surface of the article manually. The tabs are normally in the form of a felt pad having a pressure-sensitive adhesive normally attaching the tabs to a carrier tape. Two or more workmen are required for the purpose of removing and finger-pressing the tabs onto the surface of the article at spaced locations thereon.

SUMMARY OF THE INVENTION

The object of this invention is to provide a mobile tab depositing dispenser for automatically applying pressure-sensitive tabs to an article, economically and expeditiously without a workman.

The dispenser comprises a frame and tape reel means for rotatably mounting a roll of carrier tape on the frame. The tape has a plurality of pressure-sensitive tabs removably attached thereon. A driven tape winding means is rotatably mounted on the frame for receiving and winding the spent tape thereon, after the tabs have been applied to the article. Guide means are provided for guiding the tape during its travel from the tape reel means to the tape winding means. Tab depositing means, mounted on the frame between the tape reel means and the tape winding means, functions to remove the tabs from the tape and apply them to the article under pressure.

BRIEF DESCRIPTION OF THE DRAWINGS

Other objects and advantages of this invention will become apparent from the following description and accompanying drawings wherein:

FIG. 1 is a side-elevational view of a tab depositing dispenser embodying this invention;

FIG. 4A is a front elevational view of the tab depositing mechanism, taken in the direction of arrows IVA—IVA in FIG. 4;

DESCRIPTION OF THE PREFERRED EMBODIMENTS

General Description

Figure 2:
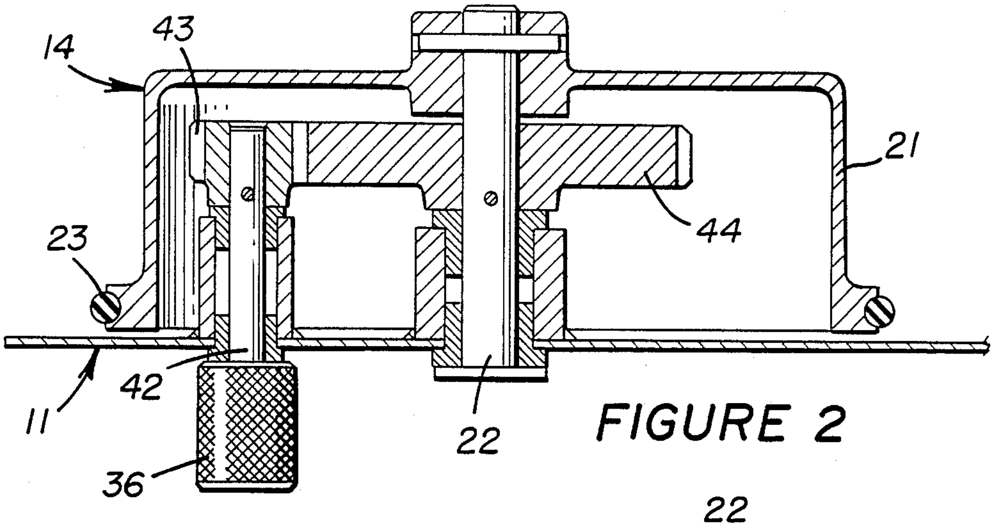
FIG. 2 is an enlarged sectional view through the dispenser, taken in the direction of arrows II—II in FIG. 1.

FIG. 1 illustrates a tab depositing dispenser 10 comprising a frame having a tape reel 12 for rotatably mounting a roll of carrier tape C thereon mounted for simultaneous rotation therewith. The standard carrier tape has a plurality of pressure-sensitive felt tabs T (FIG. 4) releasably secured thereon by a standard (and reusable) adhesive whereby the separate tabs are adapted to be automatically removed from the carrier tape and pressed onto an underlying surface of a moving article A. The tabs are particularly useful for application to a pane of glass, a mirror, or other articles having an exposed surface requiring protection during storage or shipping.

A tape winder 13 is also rotatably mounted on the frame for receiving and winding the spent carrier tape thereon, after the tabs have been applied to the article. As described more fully hereinafter, a drive wheel 14 is rotatably mounted on the frame to extend vertically below a lower edge thereof to frictionally engage article A and rotate when the article and dispenser are moved longitudinally relative to each other. Rotation of the drive wheel will, in turn, drive tape winder 13 whereby the carrier tape will be paid-out from tape reel 12 for application of the tabs to the article in a spaced, linear pattern thereon.

As further shown in FIG. 1, the carrier tape is threaded through suitably arranged guide rollers for tape-guiding purposes and to maintain a predetermined tension on the tape during the tab depositing operation. A depositing mechanism 15, including a forwardly and downwardly sloped guide bracket 16 and a press roller 17, function to remove individual tabs T from carrier tape C and apply the tabs to article A.

Figure 5:
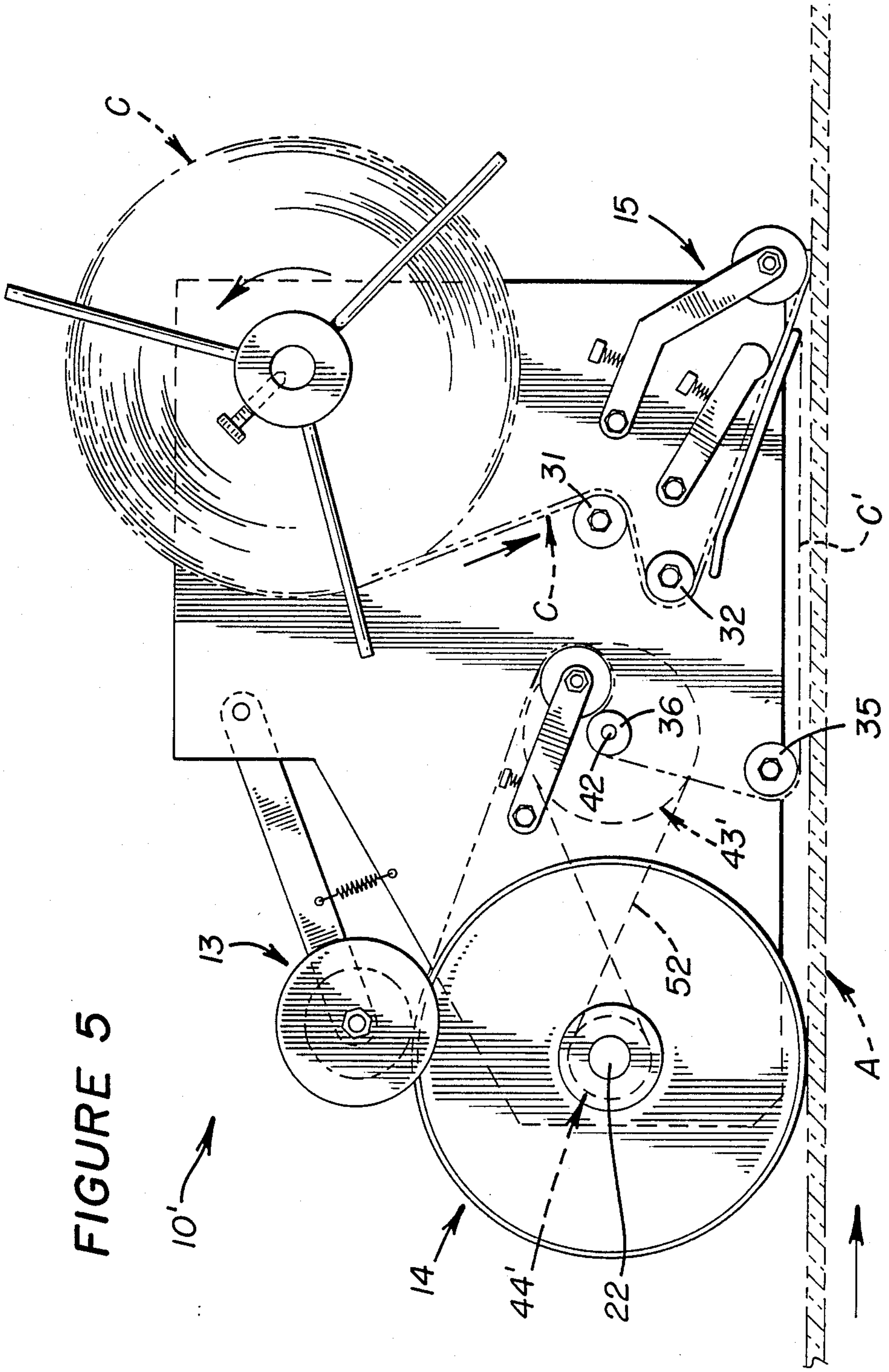
FIG. 5 is a side elevational view of a second tab depositing dispenser embodiment of this invention.
Figure 6:
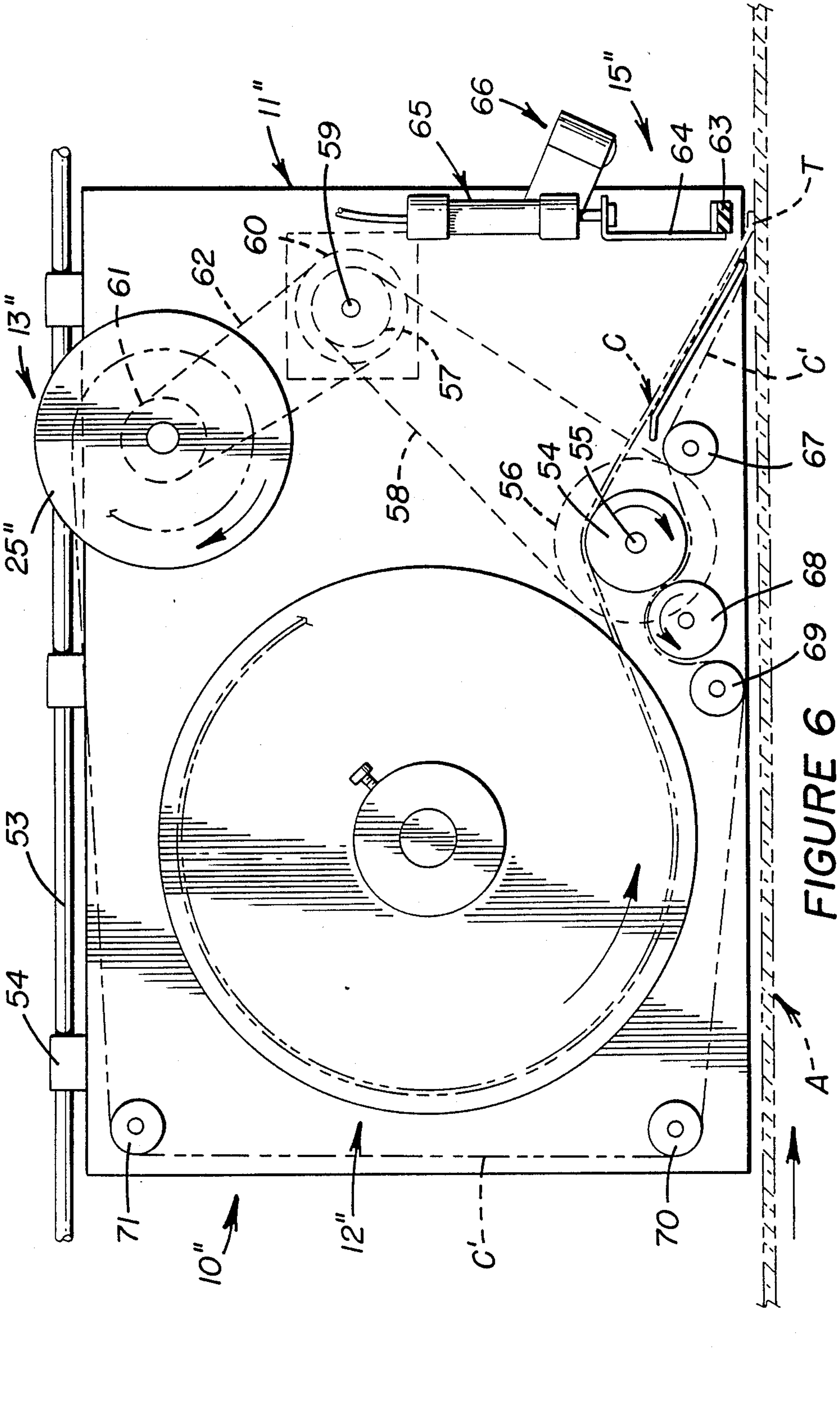
FIG. 6 is a side elevational view of a third tab depositing dispenser embodiment of this invention.

FIGS. 5 and 6 illustrate modifications to the dispenser, described hereinafter.

DETAILED DESCRIPTION

As shown in FIG. 1, tape reel 12 comprises a collar 18 releasably attached to a shaft 19 by a thumb screw 20. Thus, the collar can be expeditiously removed from the shaft for placement of an unused roll of carrier tape C thereon. A plurality of radially extending and circumferentially spaced spikes 21 are secured to the collar to retain the carrier tape in position between frame 11 and the collar when the carrier tape is paid-out, i.e., to prevent lateral displacement of the carrier tape relative to shaft 19.

Figure 3:
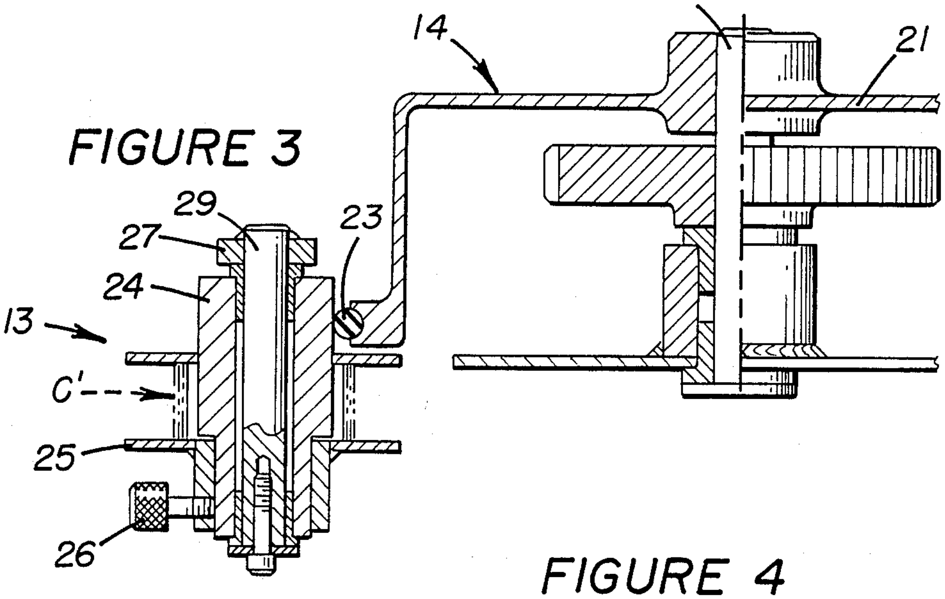
FIG. 3 is an enlarged sectional view through the dispenser, taken in the direction of III—III in FIG. 1.

Referring to FIGS. 1–3, drive wheel 14 comprises a hub 21 secured on a shaft 22, rotatably mounted on frame An elastomeric drive member 23, such as an O-ring, is suitably mounted in a circumferential groove formed on the periphery of the hub to adapt it for frictional engagement with article A (FIG. 1). The drive member also frictionally engages a hollow shaft 24, having a reel 25 of tape winder 13 removably attached thereon by a set screw 26 (FIG. 3).

Thus it can be seen that when article A is moved rightwardly in FIG. 1, relative to dispenser 10 which is held stationary (e.g., by a stationary bracket, not shown), that its frictional engagement with drive wheel 14 will function to rotate the drive wheel counterclockwise to, in turn, rotate reel 2 of tape winder 13 clockwise. Alternatively, the dispenser can be moved over the article manually with the article being held stationary on a work table. Reel 2 is mounted on frame 11 by an arm 27, having its distal end pivotally mounted on the frame by a pin 28. As shown in FIG. 3, the proximal end of the arm is secured to a shaft 29, having hollow shaft 24 rotatably mounted thereon by suitable bearings. Although tape tension will normally hold shaft 24 in frictional engagement with drive member 23 of wheel 14, a tension coil spring can be attached between frame 11 and arm 27 to aid in this function.

As shown in FIG. 3, when spent carrier tape C' is fully wound onto reel 25 of tape winder 13, a set or thumb screw 26 can be released to remove the reel from shaft 4 for replacement by an empty reel. As shown in FIG. 1, thumb screw 20 can also be released at this time to remove collar 18 from shaft 19 for the mounting of an unused roll of carrier tape C on the shaft. The new carrier tape is threaded through various guide rollers mounted on frame as further shown in FIG. 1, to maintain a predetermined tension on the tape and to ready the dispenser for continued operation.

In particular, the tape is threaded through guide rollers 31 and 32, pulled manually over the forward end of guide bracket 6 and positioned adjacent to press roller 17. The spent carrier portion C' of the tape is then manually reverse-bent under the leading edge of the guide bracket and threaded through a channel 33 (FIG. 4A). The channel is defined between the underside of the guide bracket and an underlying guide bar 34, formed integrally with the guide bracket. As shown in FIG. 4A, the channel is generally an inverted C-shape to provide an open side to facilitate insertion of the tape therein.

A sufficient number of tabs T are manually pressed onto the upper surface of article A until a sufficient length of spent carrier tape C' is available to positively wind it onto reel 25 of tape winder 13. The spent portion of the carrier tape is further guided sequentially over rollers 35 and 36, both rotatably mounted on frame 11, and a roller 37 rotatably mounted on the distal end of an arm 38. The proximal end of the arm is pivotally mounted on the frame by a pin 39.

As further shown in FIG. 1, a tension coil spring 41 is preferably mounted between the frame and arm 38 to urge the arm in a clockwise direction to frictionally nip and pull and to maintain the proper tension on the spent carrier tape. The spring further aids in maintaining frictional contact between drive wheel 14 and tape winder 13, through the portion of the tape extending therebetween (as discussed above, spring 30 is optional). As shown in FIGS. 1 and 2, roller 36 is preferably mounted and secured on a shaft 42, rotatably mounted on frame 11.

The opposite end of the shaft has a pinion gear 43 secured thereon that meshes with a spur gear, secured on drive shaft 22 of drive wheel 14. Thus, both reel 25 of tape winder 13 and roller 36 will be driven in response to rotation of the drive wheel. This arrangement will aid in the wind-up of spent carrier tape C' and aid in pulling the tape through the dispenser when tabs T are applied to article A.

Figure 4:
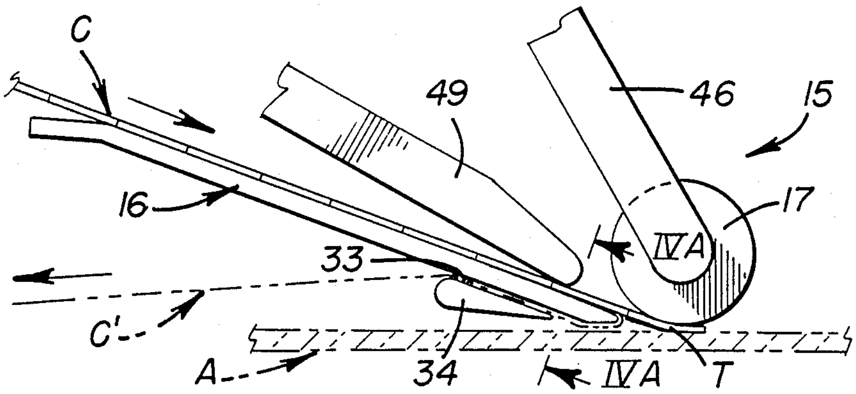
FIG. 4 is an enlarged side elevational view of a tab depositing mechanism, taken within circle IV—IV in FIG. 1, employed in the dispenser for applying pressure-sensitive tabs from a carrier tape to an underlying article.

Returning again to tab depositing mechanism 15, as shown in FIGS. 1 and 4, guide bracket 16 extends forwardly and downwardly and is disposed at an acute angle relative to a longitudinal axis of the dispenser and the flat upper surface of article A. In FIG. 4A, this angle is shown as approximating 20°. As shown in FIG. 4A (wherein tape C has been removed for clarity purposes), the upper surface of the guide bracket is flat, but could have a limited depth groove (not shown) formed through the entire length thereof to accommodate the sliding movements of carrier tape C thereon. The frontal edge of the guide bracket is preferably slightly rounded to facilitate a smooth transition of spent carrier tape C' through channel 33 and precise removal of each tab T from the tape.

Roller 17 is positioned forwardly of the guide bracket to apply a predetermined uniform downward pressure on each tab to firmly adhere the tab to article A. As described above, the underside of each tab has a standard (and reusable) pressure-sensitive adhesive coated thereon to facilitate such securance. The roller may be composed of an elastomeric or plastic material exhibiting sufficient softness and resiliency to prevent marring or damage to the upper surface of article A, but yet providing sufficient hardness to firmly apply the tabs to the article.

As shown in FIG. 1, roller 17 is mounted on the distal end of an arm 46, pivotally mounted on frame 11 by a pin 47. A compression coil spring 48 is mounted between the frame and the arm to bias the arm clockwise in FIG. 1 to apply a predetermined pressure on the roll for tab securance purposes. Tab depositing mechanism 14 preferably also includes a hold-down bar 49, having its leading end disposed in overlying relationship on carrier tape C.

The hold-down bar will aid guide bracket 16 and press roller 17 in the precise positioning of the tape during the tab removal operation. Hold-down bar 49 is pivotally mounted on frame 11 by a pin 0. The bar is preferably spring-biased downwardly under a predetermined force by a compression coil spring 1, mounted between the frame and the bar.

FIG. 5 illustrates a modified dispenser 10' wherein corresponding components and structures are depicted by identical numerals, but with numerals depicting modified constructions being accompanied by a prime symbol (').

Dispenser 10' essentially differs from dispenser 10 in that gears 43 and 44 (FIG. 2) have been replaced by pulleys 43' and 44', respectively, and a standard endless drive belt 52 to rotate driven roller 36 in response to rotation of drive wheel 14. Alternatively, standard sprockets could be used in lieu of the pulleys and a standard drive chain used in lieu of the belt.

FIG. 6 illustrates another modified dispenser 10" wherein components and structures are identified in a similar manner.

A frame 11" of the dispenser is adapted to be supported on at least one horizontally disposed beam 3 by a plurality of support brackets 4, secured to the frame. Standard bearings or rollers (not shown) can be suitably mounted within the brackets to facilitate longitudinal movement of the dispenser, relative to article during the tab depositing operation. Alternatively, the dispenser can be held in a fixed position on beam 53 and the article can be conveyed (e.g., by an underlying belt conveyor) or manually moved longitudinally relative to the dispenser to deposit the tabs thereon, generally in the manner described above.

Dispenser 10" also differs in the arrangement of its various guide rollers, tape reel 12", tape winder 13" and their associated drive mechanisms. In particular, tape reel 12" is adapted to pay-out carrier tape C over a roller 4, secured on a drive shaft 5 of an electric or hydraulic drive motor (not shown). A pulley 56 is also secured to drive shaft to drive a pulley 7 via a belt 8.

Pulley 7 is secured on a shaft 59, rotatably mounted on frame 11", to drive a second pulley 60 secured thereon. Pulley 60 will, in turn, drive a pulley 61 of a modified tape winder 13", via a belt 62. It should be understood that the pulleys and belts could be replaced with an equivalent sprocket and chain drive system, similar to that described above with reference to dispenser 10" of FIG. 5.

When carrier tape C passes over and is driven by roller 54, it will proceed through a modified tab depositing mechanism 15" in substantially the same manner as described above. Tab depositing mechanism 15" essentially differs from corresponding mechanism 15, described above, in that roller 17 (Figure 1) has been replaced with an elastomeric pad 3. The pad is secured on the distal end of a bracket 64, attached to the rod end of a single acting air or hydraulic cylinder 65.

The standard fluid cylinder is adapted to extend when pressurized to apply the tabs to article A under the compression of pad 63 thereon. The cylinder can be spring-loaded to retract its rod and pad 63 when pressure is relieved therein. A photo-electric cell 66 can be mounted adjacent to the pad to control the timed relationship of tab dispensing relative to the tape pulling sequence of tape winder 13. As further shown in FIG. 6, when spent carrier tape C' leaves tab depositing mechanism 15", it sequentially passes over rollers 67, 54, and 68–71 prior to its wind-up on reel 2" of tape winder 13".

From the above description, it can be seen that applicant has provided a highly versatile dispenser for automatically applying pressure sensitive tabs to an article, economically and expeditiously without the use of a workman. Depositing frequency can be readily achieved by sizing and design of the various drive wheels, rollers, gearing and belt-pulley (or chain-sprocket) systems, as will be appreciated by those skilled in the arts relating hereto. The dispenser is especially designed to be held in a fixed position with the article on which the tabs are applied, moved relative thereto.

I claim:

1. A dispenser for continuously applying a plurality of longitudinally spaced pressure-sensitive tabs to the surface of an article comprising a frame, continuously rotatable tape reel means for rotatably mounting a roll of carrier tape on said frame, said tape having a plurality of pressure-sensitive tabs removably secured thereon, continuously rotatable tape winding means rotatably mounted on said frame for receiving and winding said tape thereon after said tabs have been applied to said article, drive means for continuously rotating said tape winding means, guide means for guiding said tape from said tape reel means to said tape winding means without interruption, and tab depositing means, mounted on said frame, for reverse bending said tape and removing said tabs from said tape and for continuously applying downward pressure on said tabs for directly applying said tabs from said tape in spaced relationship to said article under pressure and without interruption as said articles pass continuously moved relative to the dispenser under said tab deposition means, including a sloped guide bracket means for receiving said carrier tape thereon from said tape reel means, tab applicator means mounted adjacent to a forward end of said guide bracket means for applying pressure downwardly on said tabs when they are applied to said article, and guide bar means disposed below the forward end of said guide bracket means for defining a channel therebetween adapted to receive said carrier tape therethrough after said carrier tape is reverse bent about the forward end of said guide bracket means and said tabs are removed therefrom.

2. The dispenser of claim 1 wherein said tape reel means comprises a shaft mounted on said frame and adapted to have said roll of carrier tape mounted thereon, a collar detachably mounted and positioned on said shaft to have said roll of carrier tape mounted axially between said collar and said frame and means extending radially outwardly from said collar for preventing lateral displacement of said carrier tape relative to said shaft.

3. The dispenser of claim 1 wherein said tape winding means comprises a reel and an arm having a first end thereof pivotally mounted on said frame and wherein said reel is rotatably mounted on a second end of said arm.

4. The dispenser of claim 3 wherein said drive means comprises a drive wheel rotatably mounted on said frame and wherein said drive wheel frictionally engages said tape winding means for rotating said reel in response to rotation of said drive wheel.

5. The dispenser of claim 4 wherein said drive wheel has an elastomeric member mounted on the periphery thereof to extend vertically below a lower edge cf said frame for engagement with said article whereby relative longitudinal movement between said drive wheel and said article will rotate said drive wheel.

6. The dispenser of claim 5 wherein said tape winding means further comprises a shaft having said reel mounted thereon and wherein said elastomeric drive member frictionally engages said shaft to rotate said shaft and said reel in response to rotation of said drive wheel.

7. The dispenser of claim 6 further comprising means for releasably attaching said reel on said shaft whereby said reel can be removed therefrom and replaced with another empty reel.

8. The dispenser of claim 1 wherein said drive means comprises drive wheel means rotatably mounted on said frame and extending therebelow for frictional engagement with said article and for engaging and rotating said tape winding means in response to rotation of said drive wheel means.

9. The dispenser of claim 8 wherein said guide means comprises a plurality of rollers rotatably mounted on said frame and having said carrier tape sequentially threaded therethrough and wherein said drive means further comprises roller drive means for positively driving at least one of said rollers in response to rotation of said drive wheel means.

10. The dispenser of claim 9 wherein said roller drive means comprises intermeshing gears.

11. The dispenser of claim 9 wherein said roller drive means comprises a belt or chain.

12. The dispenser of claim 1 wherein said drive means comprises a plurality of belts or chains.

13. The dispenser of claim 1 wherein said tab depositing means further comprises hold down means overlying said guide bracket means for holding said carrier tape on said guide bracket means.

14. The dispenser of claim 1 wherein said tab applicator means comprises a roller engageable with said tabs.

15. The dispenser of claim 14 wherein said roller is rotatably mounted on an arm pivotally mounted on said frame and further comprising spring means for biasing said roller into contact with said tabs.

16. The dispenser of claim 1 wherein said tab applicator means comprises a pad and means for reciprocally mounting said pad on said frame for engagement with said tabs for application thereof to said article.

17. The dispenser of claim 16 wherein said last-mentioned means comprises fluid cylinder means attached to said pad for selectively reciprocating said pad into contact with said tabs.

18. The dispenser of claim 1 further comprising means for holding said dispenser in a fixed position relative to said article whereby said tabs can be automatically applied to said article when said article is moved relative to said dispenser.

19. The dispenser of claim 1 further comprising means defining an open-side on said channel to facilitate insertion of said tape therein.

* * * * *

UNITED STATES PATENT AND TRADEMARK OFFICE

CERTIFICATE OF CORRECTION

PATENT NO. : 4,869,775
DATED : September 26, 1990
INVENTOR(S) : John P. Quittner It is certified that error appears in the above-identified patent and that said Letters Patent is hereby corrected as shown below:

IN THE DESCRIPTION OF THE PREFERRED EMBODIMENTS:

Column 2, line 6, after "frame" insert --11--.

IN THE DETAILED DESCRIPTION:

Column 2, line 55, after "frame" insert --11.-- and line 67 after "reel" delete "2" and insert --25--.

Column 3, line 2, after "Reel" delete "2" and insert--25--, line 14 after "shaft" delete "4" and insert --24--, line 19, after "frame" insert --11,-- and line 24, after "bracket" delete "6" and insert --16--.

Column 4, line 31, after "pin" delete "0" and insert--50--, line 33, after "spring" delete "1" and insert --51--, line

UNITED STATES PATENT AND TRADEMARK OFFICE
CERTIFICATE OF CORRECTION

PATENT NO. : 4,869,775

DATED : September 26, 1989

INVENTOR(S) : John P. Quittner

It is certified that error appears in the above-identified patent and that said Letters Patent is hereby corrected as shown below:

51, after "beam" delete "3" and insert --53--, line 52, after "brackets" delete "4" and insert --54--, line 66, after "roller" delete "4" and insert --54-- and after "shaft" delete "5" and insert --55--. Line 67, after "shaft" add --55--, after "pulley" delete "7" and insert --57-- and after "belt" delete "8" and insert --58--.

Column 5, line 1, after "Pulley" delete "7" and insert --57--, line 8, change "10"" to --10'--.

Line 15, after "pad" delete "3" and insert --63-- and line 28, after "reel" delete "2"" and insert --25"--.

Signed and Sealed this

Second Day of October, 1990

Attest:

HARRY F. MANBECK, JR.

Attesting Officer

Commissioner of Patents and Trademarks